No. 679,215. Patented July 23, 1901.
H. C. BULL.
METHOD OF EXTRACTING GOLD FROM SEA WATER.
(Application filed Feb. 5, 1900.)
(No Model.)
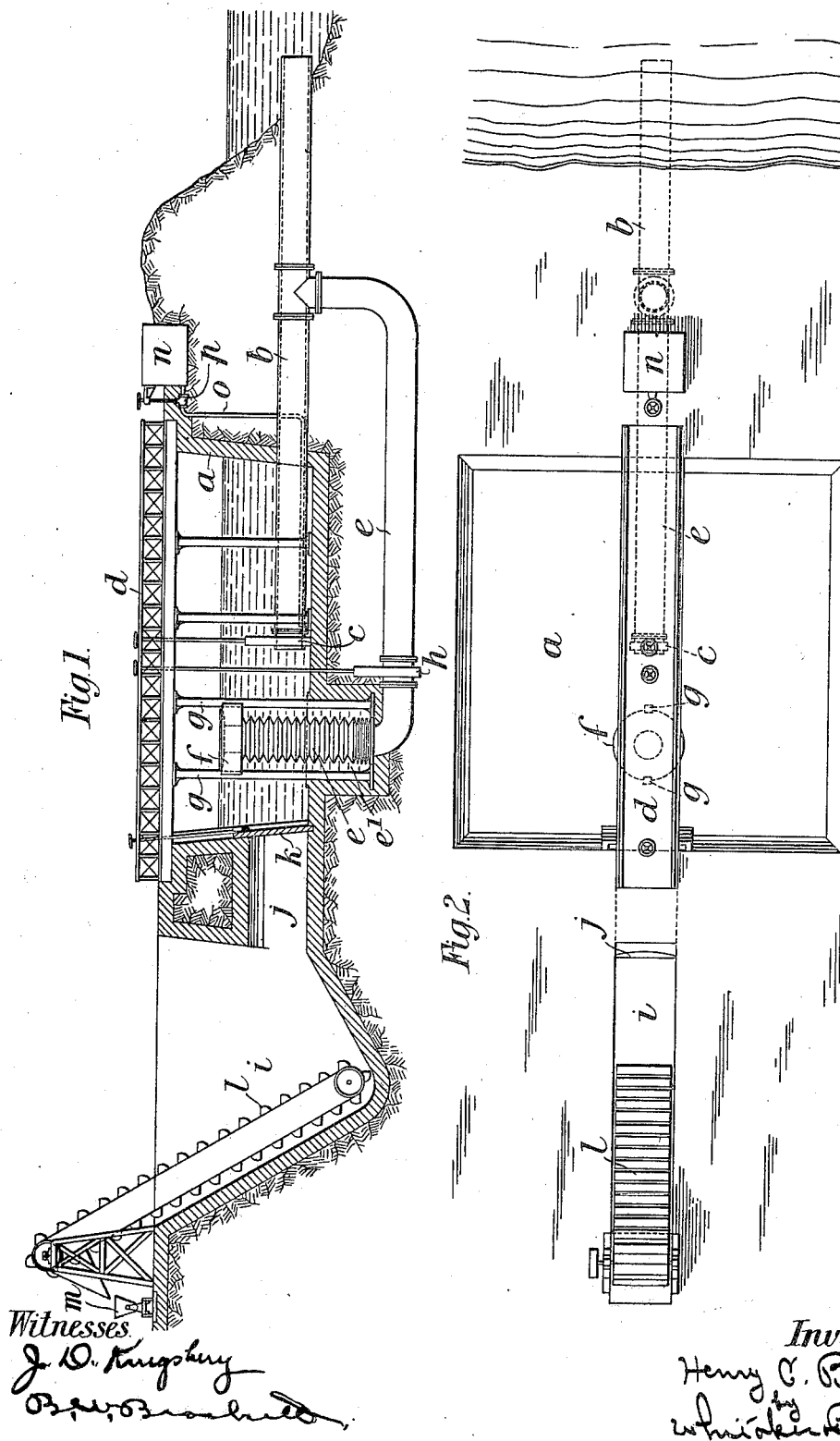
Witnesses
Inventor.

United States Patent Office.

HENRY CLAY BULL, OF LONDON, ENGLAND, ASSIGNOR OF ONE-HALF TO ARTHUR WATLING, OF SAME PLACE.

METHOD OF EXTRACTING GOLD FROM SEA-WATER.

SPECIFICATION forming part of Letters Patent No. 679,215, dated July 23, 1901.

Application filed February 5, 1900. Serial No. 4,045. (No specimens.)

*To all whom it may concern:*

Be it known that I, HENRY CLAY BULL, a subject of the Queen of Great Britain, residing at 15 West Square, Lambeth, London, England, have invented new and useful Improvements in the Extraction of Gold from Sea-Water, of which the following is a specification.

This invention relates to the extracting of gold from sea-water.

It is well known that gold exists in sea-water, and it is believed that it exists in the form of iodid of gold. The object of this invention is to extract such gold in a simple and economical manner, so that notwithstanding the large volume of water to be dealt with and the minute quantities in which the gold is found the desired object can be effected with commercial success.

For the purpose of this invention the sea-water is collected in a tank or reservoir and is rendered alkaline by the addition of lime, preferably in the form of milk of lime in a caustic state, which combines with the iodin of the iodid of gold, forming iodid of calcium, and the gold being set free settles to the bottom. After a sufficient time has been allowed for settlement the water is siphoned off or otherwise removed and the gold is separated or extracted from the sludge by any suitable means.

Suitable apparatus for carrying out my invention is illustrated in the accompanying drawings, in which—

Figure 1 is a sectional elevation of such apparatus, and Fig. 2 is a plan.

In the figures, $a$ indicates a tank or reservoir, which is built up or arranged in any suitable and convenient manner and preferably near the sea-shore in such a position that it can be filled and emptied by the rise and fall of the tide.

$b$ is the pipe through which the water enters the tank, the flow through the said pipe being controlled by means of a valve $c$, which, as shown, is arranged to be operated from a bridge $d$, which spans the tank.

$e$ is the pipe through which the water is discharged from the tank. This discharge-pipe on the tank end is provided with a movable mouthpiece which is adapted to be supported by a float at some little distance below the level of the water, so that the water which is discharged is drawn from the top of the tank and not from the bottom, whereby the sediment which is left upon the floor of the tank will not be disturbed. As shown in the drawings, the portion of the pipe $e$ within the tank is represented as being collapsible and attached to a float $f$, working between guides $g\ g$, which may form some of the supports of the bridge. The collapsible portion of the discharge-pipe $e$ is arranged to drop into a pit $e'$, so as to permit the mouth of the discharge-pipe to descend to nearly the level of the floor.

$h$ is a valve also operated from the bridge and which serves for preventing the discharge of the water from the tank when desired.

$i$ is a pit which is connected with the tank $a$ by a tunnel $j$, the said pit serving to receive the sludge, which after the discharge of the water remains upon the floor of the tank, the tunnel $j$ being, as shown, high enough to allow the workmen to push the sludge before them into the pit $i$.

$k$ is a water-tight door or sluice-gate which serves for preventing the water from flowing from the tank into the pit $i$. The said door or sluice-gate is operated from the bridge $d$.

$l$ is an elevator which raises the sludge from the pit $i$ and delivers it either into trucks $m$, by which it can be transported to any suitable place for treatment or directly into apparatus for treating it.

$n$ is a tank for containing the milk of lime for treating the sea-water, from which tank a pipe $o$ leads to a point adjacent to the delivery point of the inlet-pipe $b$, and $p$ is a valve for regulating the flow of the milk of lime.

The mode of carrying out the process by means of the apparatus hereinbefore described is as follows: The floor of the tank $a$ being clean and the discharge-valve $h$ and door $k$ being closed the valve $c$ is opened to admit the sea-water through the pipe $b$ and at the same time the valve $p$ is opened to allow the milk of lime from the tank $n$ to flow through the pipe $o$ and mix with the incoming sea-water. When the tank is filled to a certain point—for instance, that of high water—(if the tank is directly filled and emptied by the rise and fall of the tide,) the valve $c$ is closed, as also is the valve $p$, and then the contents of the tank are allowed to settle, with the result that a sludge or mud containing the gold deposits on the floor of the tank. When this deposit has taken place, the valve $h$ is opened, so that the water from the tank will flow out through the pipe $e$. It will be noticed that by means of the floating discharge-nozzle $f$ the discharge takes place from the surface of the water, so that the sludge, which is lying upon the floor, is not disturbed, as would be the case if the discharge took place from the bottom of the tank. When practically all the water has been discharged, the collapsible portion of the pipe $e$, having sunk down into the pit $e'$, the valve $h$ is closed and the door $k$ opened and the sludge which is upon the floor, together with the small remaining quantity of water, is discharged by workmen into the pit $i$ by means of squeegees or other suitable means, and from this pit the sludge is lifted by the elevator and delivered into the wagons $m$. The floor having been thus cleaned the door $k$ is again closed, as also is the valve $h$, while the inlet-valve $c$ and the milk-of-lime valve $p$ are opened, and the tank is refilled, as hereinbefore described.

It is advisable that the amount of sludge which has to be treated should be as small as possible. In practice I have found it advantageous to mix the milk of lime and sea-water in the proportion of one part of unslaked lime (to which water is subsequently added to make milk of lime) to four thousand five hundred parts of sea-water, although a greater or lesser proportion of lime may be used.

The reaction which takes place in carrying out my process may be expressed by the following formula:

$$2AuI + CaO = Au_2O + CaI_2.$$

As hereinbefore stated, any suitable means may be employed for extracting the metallic gold from the sludge. A very advantageous arrangement consists in passing the sludge through amalgamators, whereby an amalgam is obtained, the separation of the gold from which can be effected in a well-known manner.

Having now particularly described and ascertained the nature of my said invention and in what manner the same is to be performed, I declare that what I claim is—

1. The method of extracting gold from sea-water consisting in adding to and mixing with the sea-water to be treated a quantity of lime sufficient to precipitate the gold which it contains in a metallic condition, substantially as described.

2. The method of extracting gold from sea-water which consists in mixing with a quantity of sea-water a proportion of milk of lime, to react upon the iodid of gold contained in the sea-water to form iodid of calcium and to liberate the gold, then allowing the sludge formed by the reaction to settle, then drawing off the water and then collecting the sludge and treating it to extract the metallic gold therefrom, substantially as described.

In testimony whereof I have hereunto set my hand this 29th day of November, 1899.

HENRY CLAY BULL.

Witnesses:
JOHN E. BOUSFIELD,
C. G. REDFERN.